United States Patent
Rydberg et al.

(10) Patent No.: US 8,002,063 B2
(45) Date of Patent: Aug. 23, 2011

(54) MOTOR VEHICLE WITH A REAR END MOUNTED BATTERY BOX

(75) Inventors: Klas Rydberg, Västra Frölunda (SE); Thomas Storsjö, Hälleviksstrand (SE); Fredrik Bengtsson, Göteborg (SE); Jan-Olof Bodin, Alingsås (SE); Sylvie Chapon, Göteborg (SE); Martin Olofsson, Göteborg (SE)

(73) Assignee: Volvo Lastuagnar AB, Goteberg (SE)

( * ) Notice: Subject to any disclaimer, the term of this patent is extended or adjusted under 35 U.S.C. 154(b) by 389 days.

(21) Appl. No.: 12/090,542

(22) PCT Filed: Oct. 9, 2006

(86) PCT No.: PCT/EP2006/009720
§ 371 (c)(1),
(2), (4) Date: Aug. 12, 2008

(87) PCT Pub. No.: WO2007/045365
PCT Pub. Date: Apr. 26, 2007

(65) Prior Publication Data
US 2009/0014224 A1    Jan. 15, 2009

(30) Foreign Application Priority Data

Oct. 17, 2005 (SE) .................................. 0502299

(51) Int. Cl.
*B60R 16/04* (2006.01)
(52) U.S. Cl. ...................................................... 180/68.5
(58) Field of Classification Search ............ 180/2.1–2.2, 180/68.5, 274, 65.29; 296/187.03; 248/638
See application file for complete search history.

(56) References Cited

U.S. PATENT DOCUMENTS

| | | | | |
|---|---|---|---|---|
| 2,035,066 A | * | 3/1936 | Havas | 180/68.5 |
| 4,074,786 A | * | 2/1978 | Joubert | 180/68.5 |
| 4,365,681 A | * | 12/1982 | Singh | 180/68.5 |

(Continued)

FOREIGN PATENT DOCUMENTS

EP    1334881 A2    8/2003

OTHER PUBLICATIONS

International Search Report from corresponding International Application PCT/EP2006/009720.

(Continued)

*Primary Examiner* — J. Allen Shriver, II
*Assistant Examiner* — James Triggs
(74) *Attorney, Agent, or Firm* — WRB-IP LLP

(57) ABSTRACT

A motor vehicle includes a frame chassis including two longitudinal beams and at least first and second cross members between the two longitudinal beams, and a battery box arranged at the rear end of the vehicle between the beams with vibration damping mounts, wherein the mounts of the battery box comprise a front mount connecting the front side of the battery box to the first adjacent cross member and a rear mount connecting the rear side opposing the front side of the battery box to the second adjacent cross member. By suspending the battery box from the cross members of the chassis frame, the mounting brackets do not collide with other components that must be accommodated in or mounted on the longitudinal chassis beams. Moreover, the battery support system according to the invention provides an advantage in terms of space.

6 Claims, 2 Drawing Sheets

U.S. PATENT DOCUMENTS

| | | | |
|---|---|---|---|
| 5,390,754 A * | 2/1995 | Masuyama et al. | 180/68.5 |
| 5,559,420 A * | 9/1996 | Kohchi | 180/68.5 |
| 5,960,901 A * | 10/1999 | Hanagan | 180/210 |
| 7,051,825 B2 * | 5/2006 | Masui et al. | 180/68.5 |
| 7,398,849 B2 * | 7/2008 | Yoshida | 180/68.5 |
| 2003/0188903 A1 * | 10/2003 | King | 180/68.5 |
| 2009/0000843 A1 * | 1/2009 | Burchett et al. | 180/68.5 |

OTHER PUBLICATIONS

International Preliminary Report on Patentability from corresponding International Application PCT/EP2006/009720.

* cited by examiner

MOTOR VEHICLE WITH A REAR END MOUNTED BATTERY BOX

BACKGROUND AND SUMMARY

The present invention relates to a motor vehicle comprising a frame chassis including two longitudinal beams and at least a first and second cross members between said two longitudinal beams, and a battery box arranged at the rear end of the vehicle between said beams with mounting means.

A battery box support assembly of such kind is known from EP 1334881 A2.

In particular in some semi-tractor variants, the battery box is positioned in the rear end of the truck, i.e. the end of the frame, in order to ensure a good weight distribution in the truck and because the space in the centre of the vehicle is limited. This rear end battery position is also advantageous as the batteries are well protected in case of a collision as they are positioned inside the chassis frame at the rear of the truck. However, this rear end battery position also displays some drawbacks. The movement of the frame is greater in the rear of the truck than in the centre of the truck. This applies both to vibrations caused by an uneven ground and to sideways movements caused by turning. Vibrations caused by an uneven ground will introduce longitudinal and horizontal movements.

The battery box known from EP 1334881 A2 is resiliently mounted to the longitudinal beams of the vehicle. Although the batteries may be protected from these longitudinal and horizontal movements by the known system, the battery box support system does not absorb the sideways movements due to vehicle turning. One reason is that the resilient mounting means are adapted for longitudinal and horizontal movements. Another reason is that the truck frame is less stiff when it comes to side forces. Since the batteries are heavy. The frame will thus flex somewhat, particularly in the rear end of the truck.

The movements caused by turning will be much greater than the movements caused by vibrations since a small turning action with the steering wheel will cause a large movement at the rear of the truck. To extend the life of the batteries, it is advantageous to limit the movement of the batteries as much as possible.

Moreover, the battery support system of EP 1 334 881 may be difficult to arrange due to other parts that must be mounted to the longitudinal chassis frame or accommodated inside the cavity of the chassis frame beams.

On this background, it is desirable to provide a vehicle with a rear end mounted battery box without the above-identified drawbacks.

According to an aspect of the present invention, a motor vehicle of the initially mentioned kind is provided, wherein the mounting means of the battery box comprises front mounting means connecting the front side of the battery box to the first adjacent cross member and rear mounting means connecting the rear side opposing said front side of the battery box to the second adjacent cross member.

By mounting and suspending the battery box from the cross members of the chassis frame, the mounting brackets do not collide with other components that must be accommodated in or mounted on the longitudinal chassis beams. Moreover, the battery support system according to an aspect of the invention provides an advantage in terms of space. A low battery position may be advantageous with respect to weight distribution in the vehicle and contribute to a low centre of gravity of the vehicle. A low battery installation is possible by an aspect of the invention since the mounting brackets can be placed on the cross members relatively unrestricted, or the cross members may be specially designed to provide for a low position of the battery box. By an aspect of the invention it is possible to tailor the position of the cross members and the vertical position of the battery box.

A further advantage is that the cross members are stiffer for side forces caused by sideway movements, e.g. caused by turning. By an aspect of the invention, it is realised that the mounting brackets are typically less dampening with respect to compression and stretching than to bending. Consequently, by an aspect of the invention a higher sideways stiffness is achieved.

Advantageously, the mounting means comprises rubber suspension brackets providing an elastomeric connection between the battery box and the cross members of the vehicle frame. However, it is realised that other types of brackets or vibration or movement absorbing mounting means may be used for connecting the battery box to the vehicle frame.

The front and rear mounting means may be different in respect to size and/or resilient characteristics. This may be advantageous since the movements at the front and the rear of the battery box differs in amplitude. When the front or the rear mounting means is a single mounting bracket, this may comprise a hinge.

The mounting means may preferably comprise four brackets for mounting the battery box. However, it is realised by an aspect of the invention that the battery box may be mounted with three mounting brackets, where either the front mounting means comprise at least one bracket and the rear mounting means comprises at least two brackets or where the front mounting means comprise at least two brackets and the rear mounting means comprises at least one bracket. A three point mounting of the battery box in the vehicle frame may be advantageous e.g. if the space is limited due to other components that must be fitted to the frame, if the weight distribution in the battery box is uneven, or if a special vibration dampening characteristics is required.

Preferably, the mounting means provide a symmetrical mounting of the battery box along the longitudinal axis of the vehicle. However, an asymmetric mounting is made possible by e.g. a three point mounting.

DESCRIPTION OF THE DRAWINGS

In the following the invention is described in more detail with reference to the accompanying drawings, in which.

DETAILED DESCRIPTION

Figure 1:
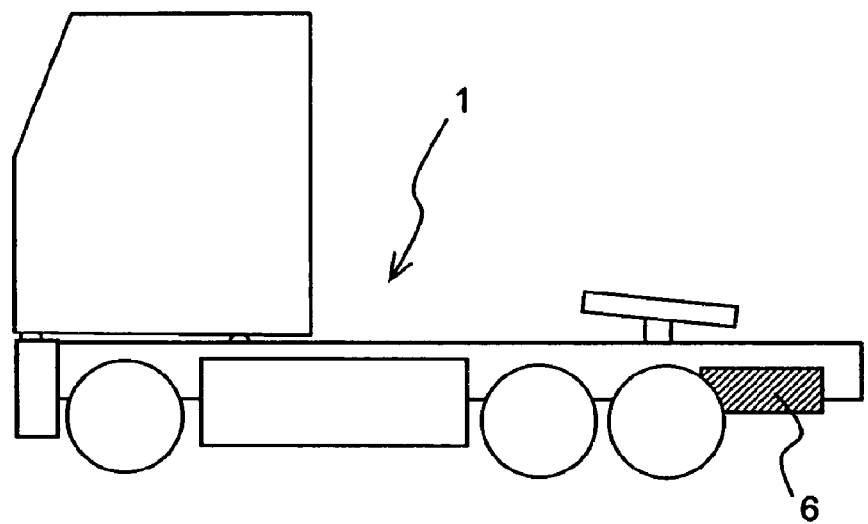
FIG. 1 is a schematic side view of a vehicle with a rear end mounted battery.

FIG. 1 shows a truck with a battery box 6 mounted in the rear end of the vehicle frame chassis 1. This battery position is advantageous in many trucks or tractors, as this leaves more space between the wheels for fuel tanks and other fluid containers that may be installed on the truck. The weight distribution is also advantageous.

Figure 2:
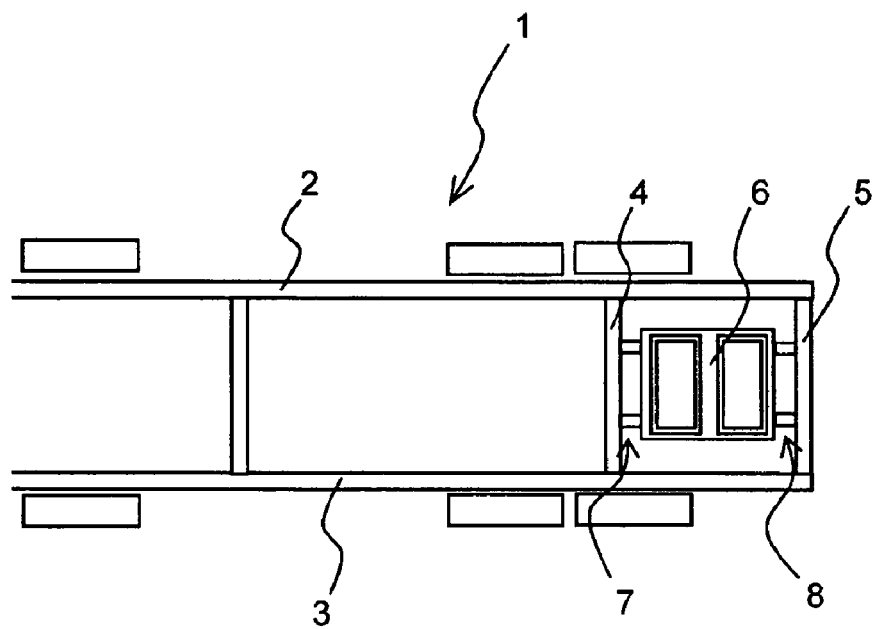
FIG. 2 is a schematic top view of a chassis of a vehicle according to an aspect of the invention.

As shown in FIG. 2, the vehicle frame chassis 1 comprise two longitudinal chassis beams 2, 3 with a number of cross members 4, 5. The battery box 6 is mounted between the two longitudinal chassis beams 2, 3 and between the two rearmost cross members 4, 5. For a longer truck, the battery box may also be mounted between other cross members than the rearmost ones. The battery box is mounted to the cross members 4, 5 by vibration absorbing mounting brackets 7, 8 preferably including mounting rubber bushings. Typically, the cross members 4, 5 are positioned somewhat lower than the longitudinal beams 2, 3 in the frame chassis 1. By mounting the battery box 6 to the cross members 4, 5 a low position of the batteries may be obtained and thereby an advantageous weight distribution in the vehicle.

Figure 3:
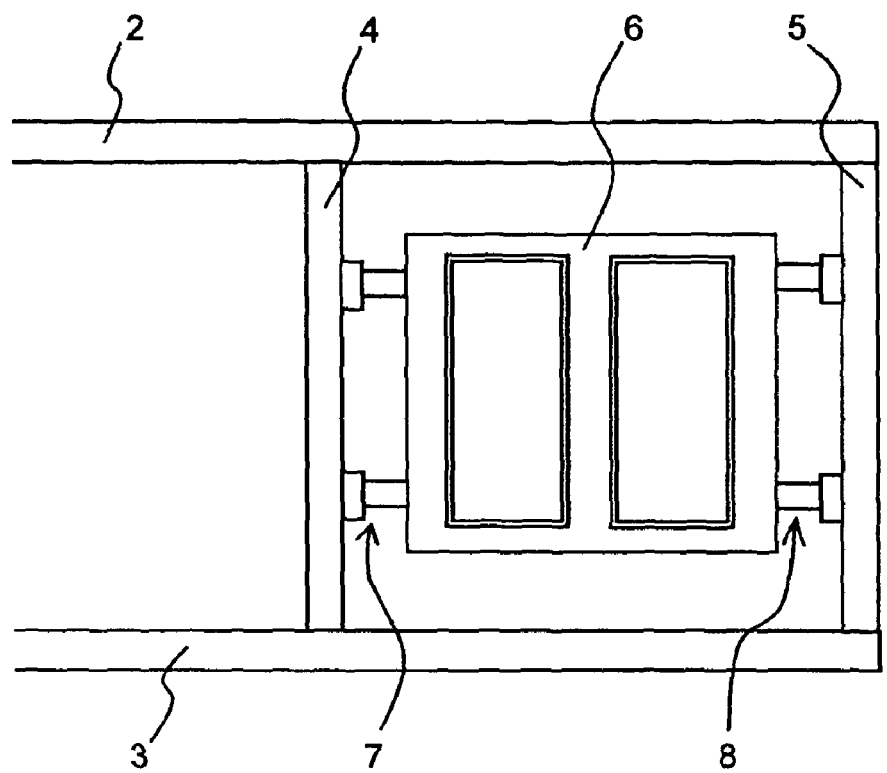
FIG. 3 is a schematic detailed view of the rear end of a vehicle chassis according to a first embodiment of the invention.
Figure 4:
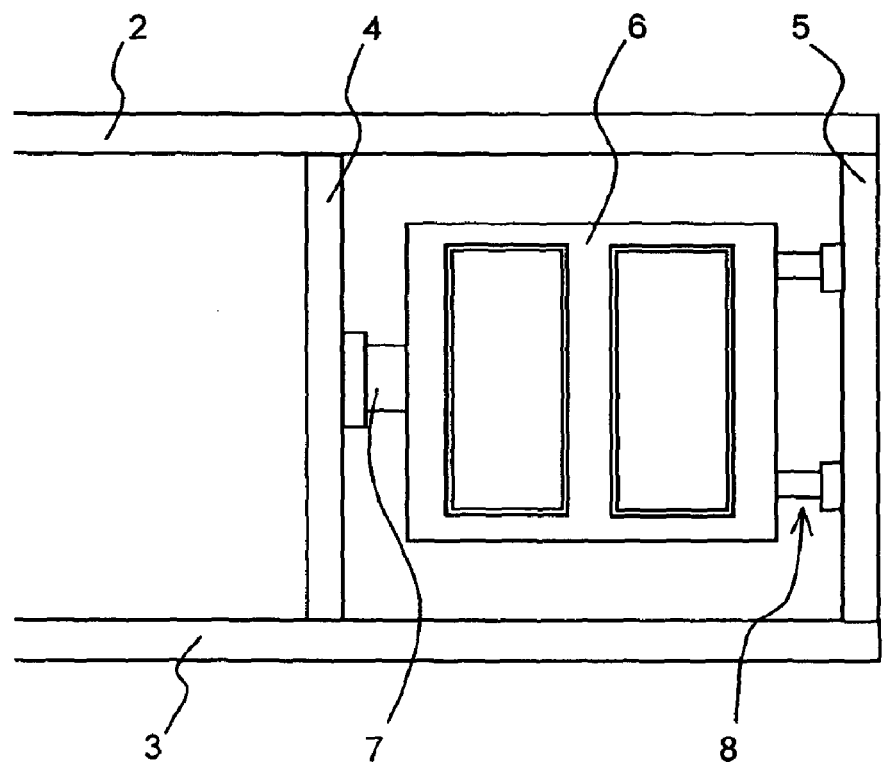
FIG. 4 is a schematic detailed view of the rear end of a vehicle chassis according to a second embodiment of the invention.

The battery box 6 comprises a carrier frame which accommodates one or more batteries. The box 6 may be mounted with one or more mounting brackets 7 at the front side of the battery box 6 and one or more brackets 8 at the rear of the battery box 6. Two examples of the battery box 6 mounting are shown in FIGS. 3 and 4, where the battery box 6 is mounted over four and three mounting brackets 7, 8, respectively. The number of mounting brackets 7, 8 and their positions may be chosen according to the specific requirements allowing for a high degree of flexibility in the battery box mounting design, whereby it is possible to tailor the battery installation on the truck to the actual requirements. As indicated in FIG. 4, the mounting brackets 7, 8 may be individually designed and dimensioned to achieve the required vibration damping mounting installation of the battery box 6.

The mounting brackets 7, 8 may de designed to suspend the battery box 6 from the cross members 4, 5 of the vehicle frame 1. The mounting brackets 7, 8 preferably include rubber bushings or similar elastomeric materials whereby vibrations in the chassis frame and movements of the vehicle may be absorbed rather than transferred to the batteries in the battery box 6. The rubber suspension mounting contributes to increasing the lifetime of the batteries.

It is understood that the terms front and rear used throughout this description and in the accompanying claims refer to the main driving direction of the vehicle.

The invention is described above with reference to some preferred embodiments. However, it is further understood that variations of the invention may be performed without departing from the scope of the invention as defined in the claims. For instance, two front mounting brackets 7 and one rear mounting bracket 8 may be chosen in accordance with the actual circumstances.

The invention claimed is:

1. A truck comprising
a frame chassis including two longitudinal beams and at least a first and second cross members between the two longitudinal beams, and
a battery box arranged at a rear end of the vehicle between the beams with a vibration damping mount, wherein the vibration damping mount of the battery box comprises a front mount connecting a front side of the battery box to the first cross member and a rear mount connecting a rear side of the battery box opposing the front side of the battery box to the second cross member, wherein the vibration damping mount comprises mounting brackets which are less dampening with respect to compression and stretching than to bending and wherein the first and second cross members are positioned lower than the longitudinal beams in the frame chassis.

2. A truck according to claim 1, wherein the front and rear mounts comprise rubber suspension brackets providing an elastomeric connection between the battery box and the cross members.

3. A truck according to claim 1, wherein the battery box is mounted with three mounting brackets, where the front mount comprises at least one bracket and the rear mount comprises at least two brackets.

4. A truck according to claim 1, wherein the battery box is mounted with three mounting brackets, where the front mount comprises at least two brackets and the rear mount comprises at least one bracket.

5. A truck according to claim 3, wherein the front and rear mounts comprise four brackets for mounting the battery box.

6. A truck according to claim 1, wherein the front and rear mounts provide a symmetrical mounting of the battery box along a longitudinal axis of the vehicle.

* * * * *

UNITED STATES PATENT AND TRADEMARK OFFICE
CERTIFICATE OF CORRECTION

| | | |
|---|---|---|
| PATENT NO. | : 8,002,063 B2 | Page 1 of 1 |
| APPLICATION NO. | : 12/090542 | |
| DATED | : August 23, 2011 | |
| INVENTOR(S) | : Klas Rydberg et al. | |

It is certified that error appears in the above-identified patent and that said Letters Patent is hereby corrected as shown below:

Title page item (73), the Assignee's name was incorrectly spelled as "Volvo Lastuagnar AB" and should be spelled as --Volvo Lastvagnar AB--.

Signed and Sealed this
Eleventh Day of October, 2011

David J. Kappos
*Director of the United States Patent and Trademark Office*